United States Patent [19]

Cothran

[11] Patent Number: 4,471,813
[45] Date of Patent: * Sep. 18, 1984

[54] HOSE CONSTRUCTION

[75] Inventor: Liggett A. Cothran, Clyde, N.C.

[73] Assignee: Dayco Corporation, Dayton, Ohio

[*] Notice: The portion of the term of this patent subsequent to Sep. 29, 1998 has been disclaimed.

[21] Appl. No.: 303,443

[22] Filed: Sep. 18, 1981

Related U.S. Application Data

[62] Division of Ser. No. 137,164, Apr. 4, 1980, Pat. No. 4,291,728.

[51] Int. Cl.³ .............................................. F16L 11/04
[52] U.S. Cl. ................................... 138/122; 138/129; 138/154
[58] Field of Search ............... 138/121, 122, 129, 135, 138/154, 143

[56] References Cited

U.S. PATENT DOCUMENTS

| 2,739,089 | 3/1956 | Hageltorn | 138/154 X |
| 3,094,147 | 6/1963 | Nemer | 138/154 X |
| 4,141,385 | 2/1979 | Siegwart | 138/154 X |
| 4,209,043 | 6/1980 | Menzel | 138/154 |

Primary Examiner—James E. Bryant, III
Attorney, Agent, or Firm—Joseph V. Tassone

[57] ABSTRACT

A convoluted hose construction comprised of an elongated helically wound elastomeric strip is provided and has first and second connecting means defining opposite side edge portions of the strip for holding the strip in its helically wound relation; and, the connecting means assures that the hose construction is held together in a high strength manner with maximum flexibility while using a minimum amount of material.

19 Claims, 5 Drawing Figures

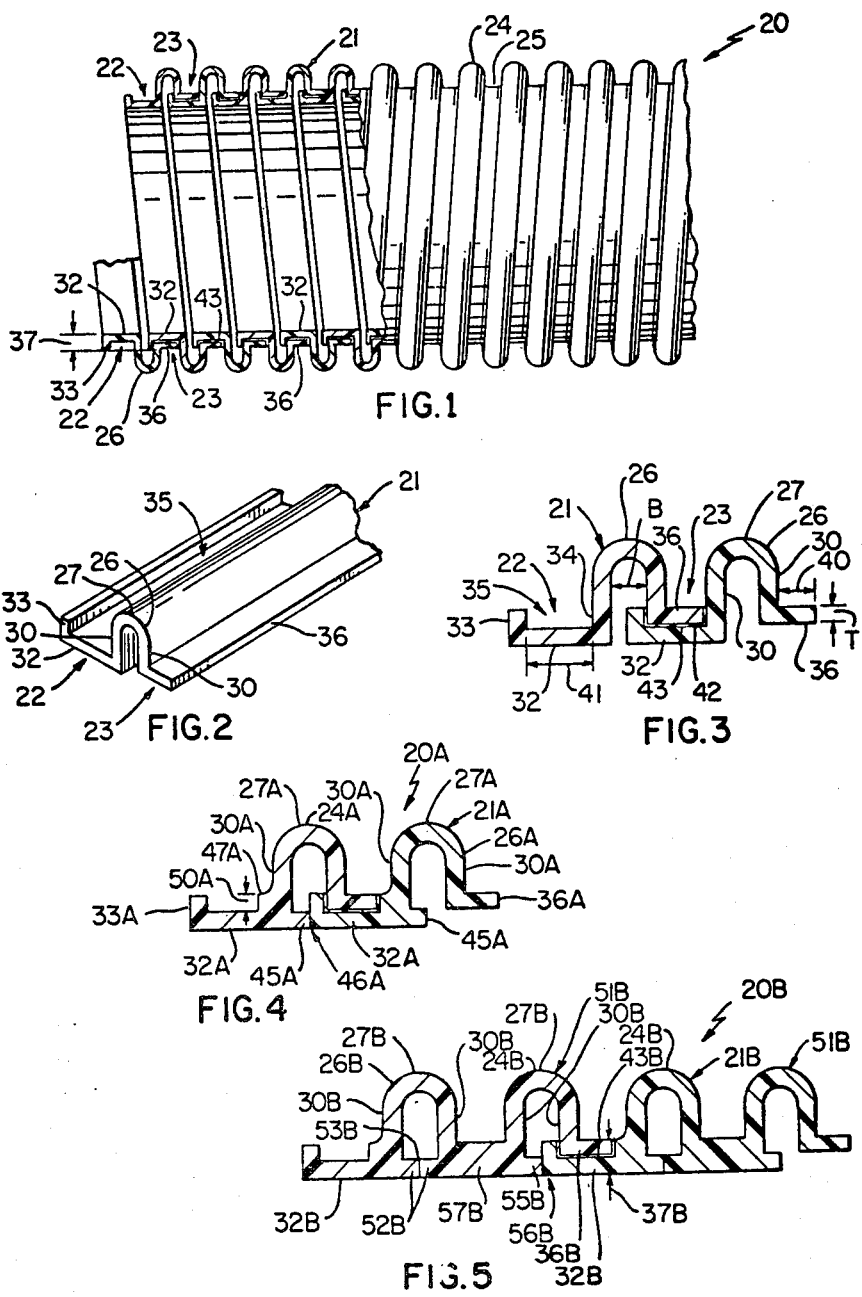

HOSE CONSTRUCTION

CROSS-REFERENCE TO RELATED APPLICATION

This application is a divisional patent application of its copending parent patent application, Ser. No. 137,164, filed Apr. 4, 1980, now U.S. Pat. No. 4,291,728.

BACKGROUND OF THE INVENTION

1. Field of the Invention

This invention relates to hose constructions and in particular to flexible hose constructions each made entirely of a single strip of a helically wound non-metallic elastomeric material.

2. Prior Art Statement

Hose construction made of one or more strips of helically wound elastomeric material are well known in the art. An example of a convoluted hose construction comprised of a helically wound elongated elastomeric strip having first and second connecting means defining opposite side portions thereof was proposed in abandoned U.S. patent application Ser. No. 637,337, filed Dec. 3, 1975; and, in this abandoned application one of the connecting means is the terminal end portion of a straight leg of a U-shaped portion of such strip. It has also been proposed in U.S. Pat. No. 2,739,089 to define a tube from plastic strip having a special bead at one side edge and a special cooperating groove at the other side edge which may be interlocked to define a tube. In addition, it has been proposed in U.S. Pat. Nos. 3,331,400, and 3,442,297 to make flexible metal tubing from a metal strip having a U-shaped portion and flanges extending outwardly from the legs of the U-shaped portion with the metal flanges being crimped together to define a quadruple thickness interconnecting joint between each turn of the metal tubing.

SUMMARY

It is a feature of this invention to provide a simple and economical convoluted hose construction made of an elongated elastomeric strip and which has improved high-strength connecting means defining opposite side edge portions thereof.

Another feature of this invention is to provide a hose constructions of the character mentioned which is highly flexible.

Another feature of this invention is to provide a hose construction of the character mentioned which is made from a helically wound strip which has a single uniform wall thickness which extends throughout its entire cross-sectional configuration in an uninterrupted manner.

Another feature of this invention is to provide a hose construction of the character mentioned made of a thermoplastic elastomeric material.

Another feature of this invention is to provide a hose construction of the character mentioned in which the connecting means defining opposite side edge portions of the substantially uniform thickness elastomeric strip used to define such hose construction when connected together have a radial thickness comprised of substantially twice such uniform thickness.

Another feature of this invention is to provide a hose construction made from a strip of the character mentioned which is produced by extrusion process.

Another feature of this invention is to provide a hose construction of the character mentioned in which connecting means defining opposite side edges of a strip used to make the hose construction may be easily fastened together using conventional hose making machinery.

Accordingly, it is an object of this invention to provide a hose construction having one or more of the novel features set forth above or hereinafter shown or described.

Other details, features, objects, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which FIG. 1 is a view illustrating one exemplary embodiment of the hose construction of this invention with portions of such hose construction illustrated in cross section and other portions broken away:

FIG. 2 is a fragmentary perspective view of a length of a strip of elastomeric material used to make the hose construction of FIG. 1 by disposing such strip in a helically wound pattern and suitably fastening opposed side edge portions together:

FIG. 3 is an enlarged cross-sectional view particularly illustrating the manner in which connecting means comprising opposite side edge portions of the helically wound strip are connected together to define the hose construction of FIG. 1;

FIG. 4 is a view similar to FIG. 3 illustrating a modified strip which may be helically wound in a similar manner as the strip of FIG. 3 to define a modification of the hose construction of this invention; and FIG. 5 is a view similar to FIG. 4 illustrating another modified strip which may also be helically wound in a similar manner as the strip of FIG. 3 to define another modification of the hose construction of this invention.

DESCRIPTION OF ILLUSTRATED EMBODIMENT

Reference is now made to FIG. 1 of the drawing which illustrates an exemplary embodiment of a convoluted hose construction of this invention which is designated generally by the reference numeral 20. The hose construction 20 is comprised of an elongated elastomeric strip which is designated generally by the reference numeral 21 (FIG. 2) and such strip has first and second connecting means each designated by the respective reference numerals 22 and 23 defining opposite side edge portions thereof and such connecting means will be described in detail subsequently. The strip 21 is helically wound as is known in the art with the first and second connecting means 22 and 23 connected together to define the hose construction 20 which has alternating crests and troughs designated by the reference numerals 24 and 25 respectively and the crests and troughs will also be described in detail subsequently.

As best seen in FIG. 3 the strip 21 has a free and unobstructed outwardly convex U-shaped portion 26 of a single uniform wall thickness continuously thoughout and the U-shaped portion is the only part of the strip which defines the crests 24. The U-shaped portion 26 is comprised of a substantially semicylindrical bight 27 and a pair of parallel legs each designated by the same reference numeral 30 extending from opposite ends of the bight 27. The legs 30 are disposed in parallel relation and define an opening or void in the central part of the U-shaped portion 26 and in the hose construction 20 such opening has a width B measured parallel to the axis of the hose construction which is roughly equal to twice the thickness of the continuous U-shaped portion 26. The hose construction 20 is easily flexed from a rectilinear configuration thereof upon applying a flexing force thereagainst due to the free U-shaped portion and the single uniform wall thickness continuously throughout. This reference to single uniform wall thickness continuously through means that all parts of the U-shaped portion, bight 27 and legs 30, flow smoothly and uninterruptedly together free of interlocking or connecting portions of different and changing cross sections. During any flexing of hose construction 20 it will be appreciated that the legs 30 tend to be compressed toward each other or to be pulled further away from each other.

The strip 21 comprises a first lateral extension 32 which has an outer end portion provided with an integral projection 33 and the projection 33 is disposed parallel to the parallel legs 30. The extension 32 with its integral projection 33 and a portion 34 defining the outer part of one of the parallel legs 30 define a wide base shallow channel 35 which has an open end opening in a direction opposite from the direction of opening of the outwardly convex U-shaped portion whereby it is seen that in the illustration of FIG. 3 the U-shaped portion 26 opens or faces vertically downwardly while the channel 35 opens or faces in a diametrically opposite direction, or vertically upwardly. The extension 32, projection 33, and portion 34 comprise the first connecting means 22.

The strip 21 has a second lateral extension 36 of rectangular cross-sectional configuration and extension 36 extends perpendicularly outwardly from the outer edge of the other of the parallel legs 30 so that with this arrangement U-shaped portion 26 is disposed roughly in the central part of the overall strip 21. The lateral extension 36 is disposed and fixed within the shallow channel 35 and comprises the previously mentioned second connecting means 23. The lateral extensions 32 and 36 are of uniform thickness T throughout and upon disposing the strip 21 in a helical pattern to define the hose construction 20, the extensions 32 and 36 cooperate to define the first and second connecting means 22 and 23 respectively having a radial thickness indicated at 37, as shown in FIG. 1 which is comprised of substantially twice the uniform thickness of the material used to define the equal thickness extensions 32 and 36 thereby assuring minimum material usage and thus minimum cost. In this example of the invention the entire strip 21 has the same uniform wall thickness thoughout its cross-sectional configuration which includes the entire U-shaped central portion 26, extension 36, and extension 32 with its projection 33.

The lateral extension 36 has a dimension 40 (FIG. 3) perpendicular to its leg 30 which is greater than the uniform thickness T and the dimension 40 is only slightly less than twice the uniform thickness T. The shallow channel 35 has a wide base as indicated earlier and the dimension of such base is designated by the reference numeral 41 and is greater than twice the thickness T and in this example is roughly three times the thickness T to define a maximum interface 42 between the lateral extension 32 and 36 and thus a maximum area of connection between the connecting means 22 and 23 defined by these lateral extensions.

The lateral extension 36 and the lateral extension 32 with its integral projection 33 may be bonded together by any suitable means known in the art; and, in this example bonding means in the form of adhesive means 43 is provided therebetween with such adhesive means comprising an initially molten thermoplastic elastomeric material which upon solidifying provides a tenacious bond between the extensions 32 and 36. The strip 21 may be made of any suitable polymeric or elastomeric material known in the art and preferably such strip is made of a synthetic plastic in the form of a synthetic thermoplastic material. In applications where the strip 21 is made of such a thermoplastic material the bonding means 43 may be the same thermoplastic material used to make the strip and may be disposed between extensions 32 and 36 in a molten condition and upon cooling solidifies to provide a tenacious bond between adjoining turns of the extensions.

The hose construction 20 has optimum flexibility due to the fact that each crest 24 thereof is defined solely by a U-shaped portion 26 of the strip 21 which is of single uniform thickness continuously throughout and as previously explained. In addition, it is seen that each of the troughs 25 of the hose construction is defined solely by extensions 36 and 32 with the extension 32 having the integral projection 33 at the terminal end thereof. Accordingly, the wall thickness of the hose construction 20 at each trough 34 has a radial thickness which is substantially twice the uniform thickness of the strip 21.

The adhesive means 43 at the interface 42 is of minimum thickness, although it is shown as having a substantial thickness in the drawing and this has been done for ease of discussion and presentation. In practice, the thickness of adhesive means 43 may be of the order of 1 to 5 mils. Further, in addition to the utilization of added adhesive at the interface 42 the bonding action may be achieved by localized heating and fusion of the extensions 32 and 36 at the interface 42, adhesive action provided by a suitable chemical solvent, or any other technique known in the art.

Other exemplary embodiments of the hose construction of this invention are illustrated in FIGS. 4 and 5 of the drawings. The hose constructions of FIGS. 4 and 5 are very similar to the hose construction 20 therefore, such hose constructions will be designated generally by the reference numerals 20A and 20B respectively and component parts of each hose construction 20A and 20B which are similar to corresponding parts of the hose construction 20 will be designated by the same reference numerals as in the hose construction 20 also followed by the associated letter designation, either A or B, and not described again in detail. Only those component parts of each hose construction 20A and 20B which are different from corresponding parts of the hose construction 20 will be designated by a new reference numeral also followed by the associated letter designation and described in detail.

The hose construction 20A of FIG. 4 is also defined of a single-piece elongated elastomeric strip 21A which has a U-shaped portion 26A, parallel legs 30A, and lateral extensions 32A and 36A. However, the leg 30A associated with the extension 32A has a portion 45A extending in a direction opposite from the direction of extension 32A. The portion 45A cooperates with the extension 32A of an adjoining turn of the helically wound strip 21A to define a substantially smooth inside surface of the hose construction and as shown at 46A in FIG. 4.

The leg 30A of U-shaped portion 26A which has the extension 32A associated therewith also has a shoulder 47A at the base of the extension 32A which has a radial thickness 50A of a dimension equal to the radial dimension of the projection 33A of extension 32A. The shoulder 47A provides increased support for extension 32A at the outer end of the associated leg 30A of the U-shaped portion 26A, yet in the hose construction 20A the crests 24A are also defined solely by the U-shaped portion 26A comprised of the semicylindrical bight 27A and parallel legs 30A extending from the bight 27A.

The hose construction 20B of FIG. 5 is also comprised of a single-piece helically wound strip 21B and has a second free unobstructed outwardly convex U-shaped portion 51B in addition to the U-shaped portion 26B. The U-shaped portion 51B together with portion 26B are the only parts of the strip 21B defining the crests 24B of the associated hose construction 20B. EAch outwardly convex U-shaped portion 26B and 51B is defined by a semicylindrical bight 27B and a pair of parallel legs 30B extending from opposite ends of the bight; and, as in the hose constructions 20 and 20A the hose construction 20B is also easily flexed from a rectilinear configuration thereof by applying a flexing force thereagainst due to the free U-shaped portions and the uniform wall thicknesses of the U-shaped portions.

The strip 21B has a lateral extension 32B extending perpendicularly outwardly from the parallel legs of the U-shaped portion 26B and away from all of the parallel legs of the strip. In addition, the strip 21B has a second lateral extension 36B extending perpendicularly outwardly from the outer edge of the outer one of the parallel legs of the U-shaped portion 51B. The strip 21B upon being helically wound has the basic characteristics of the strips 21 and 21A; however, has the advantage that for each helical turn thereof the strip defines a greater axial length of the hose construction 20B due to the provision of a pair of crests 24B with each turn.

It will also be seen that upon helically winding the strip 21B and fastening the extensions 32B and 36B between adjoining turns together, the resulting hose construction 20B has a substantially smooth inside surface. This smooth inside surface is due to the construction and arrangement of a pair of abutting projections 52B associated with each U-shaped portion 26B and as shown at 53B. The specified smooth inside surface of hose construction 20B is also due to a portion 55B which is similar to the portion 45A of the strip 21A. The portion 55B is adapted to be disposed in close proximity (basically adjoining) the outer end of the extension 32B of an immediately adjacent turn as shown at 56B to help define the previously mentioned smooth inside surface for the hose construction 20B.

The strip 21B has a single-thickness integral portion 57B disposed between and basically interconnecting U-shaped portions 26B and 51B. The portion 57B has an overall radial thickness which is roughly equal to the radial thickness 37B of the bonded lateral extensions 32B and 36B with adhesive or bonding means 43B therebetween.

Each strip 21, 21A, and 21B may be made of any suitable polymeric material. Preferably each of these strips is made of an elastomeric thermoplastic material having resiliency and plastic memory. In addition, each strip 21, 21A, and 21B may be made by any suitable manufacturing technique or process and preferably each strip is made by extrusion through an associated extrusion die having a configuration which assures the provision of each strip 21, 21A, and 21B essentially as illustrated in the drawing.

While present exemplary embodiments of this invention and methods of practicing the same, have been illustrated and described, it will be recognized that this invention may be otherwise variously embodied and practiced within the scope of the following claims.

What is claimed is:

1. In a convoluted hose construction comprising an elongated elastomeric strip having first and second connecting means defining opposite side edge portions thereof, said strip being helically wound with said first and second connecting means connected together to define said hose construction having alternating crests and troughs, said strip having a plurality of spaced apart free unobstructed outwardly convex U-shaped portions each being of a single uniform wall thickness continuously throughout which are the only parts of said strip defining said crests, each said outwardly convex U-shaped portion being defined by a bight and a pair of parallel legs extending from opposite ends of said bight, said hose construction being easily flexed from a rectilinear configuration upon applying a flexing force thereaginst due to said free U-shaped portions and uniform wall thickness, said strip comprising a first lateral extension extending perpendicularly outwardly from one of said parallel legs of an adjacent U-shaped portion and away from all of said legs, the improvement in which, said first lateral extension has an outer end portion provided with an integral projection disposed parallel to said parallel legs, said first extension together with said integral projection and a portion of said one of said parallel legs defining a wide base shallow channel which has an open end opening in a direction opposite from the direction of opening of said adjacent outwardly convex U-shaped portion and comprising said first connecting means, and a second lateral extension of rectangular cross-sectional configuration extending perpendicularly outwardly from the outer edge of one of said parallel legs of an adjacent U-shaped portion so that said U-shaped portions are disposed roughly in the central part of said strip, said second lateral extension being disposed and fixed within said channel and comprising said second connecting means, said lateral extensions being substantially of said uniform thickness and upon disposing said strip in said helical pattern said extensions cooperate to define said first and second connecting means having a radial thickness comprised of substantially twice said uniform thickness thereby assuring minimum material usage and thus minimum cost.

2. In a convoluted hose construction comprising an elongated elastomeric strip having first and second connecting means defining opposite side edge portions thereof, said strip being helically wound with said first and second connecting means connected together to define said hose construction having alternating crests and troughs, said strip having a plurality of spaced apart free unobstructed outwardly convex U-shaped portions each being of a single uniform wall thickness continuously throughout which are the only parts of said strip defining said crests, each said outwardly convex U-shaped portion being defined by a bight and a pair of parallel legs extending from opposite ends of said bight, said hose construction being easily flexed from a rectilinear configuration upon applying a flexing force thereagainst due to said free U-shaped portions and uniform wall thickness, said strip comprising a first lateral extension extending perpendicularly outwardly from one of said parallel legs of an adjacent U-shaped portion and away from all of said legs, the improvement in which, said first lateral extension has an outer end portion provided with an integral projection disposed parallel to said parallel legs, said first extension together with said integral projection and a portion of said one of said parallel legs defining a wide base shallow channel which has an open end opening in a direction opposite from the direction of opening of said adjacent outwardly convex U-shaped portion and comprising said first connecting means, and a second lateral extension of rectangular cross-sectional configuration extending perpendicularly outwardly from the outer edge of one of said parallel legs of an adjacent U-shaped portion so that said U-shaped portions are disposed roughly in the central part of said strip, said second lateral extension being disposed and fixed within said channel and comprising said second connecting means, said lateral extensions being substantially of said uniform thickness and upon disposing said strip in said helical pattern said extensions cooperate to define said first and second connecting means having a radial thickness comprised of substantially twice said uniform thickness thereby assuring minimum material usage and thus minimum cost, said second lateral extension having a dimension perpendicular to its leg which is greater than said uniform thickness and said wide base of said channel being at least twice said uniform thickness to thereby define a maximum interface between said lateral extensions and thus a maximum area of connection between said connecting means.

3. A hose construction as set forth in claim 2 and further comprising means bonding said extensions together as said interface.

4. A hose construction as set forth in claim 3 in which said elongated elastomeric strip is a strip of thermoplastic material.

5. A hose construction as set forth in claim 4 in which said adhesive means comprises an initially molten elastomeric material.

6. A hose construction as set forth in claim 5 in which said initially molten elastomeric material is made of the same material as said strip.

7. In a convoluted hose construction comprising an elongated elastomeric strip having first and second connecting means defining opposite side edge portions thereof, said strip being helically wound with said first and second connecting means connected together to define said hose construction having alternating crests and troughs, said strip having a plurality of spaced apart free unobstructed outwardly convex U-shaped portions each being of a single uniform wall thickness continuously throughout which are the only parts of said strip defining said crests, each said outwardly convex U-shaped portion being defined by a bight and a pair of parallel legs extending from opposite ends of said bight, said hose construction being easily flexed from a rectilinear configuration upon applying a flexing force thereagainst due to said free U-shaped portions and uniform wall thickness, said strip comprising a first lateral extension extending perpendicularly outwardly from one of said parallel legs of an adjacent U-shaped portion and away from all of said legs, the improvement in which, said first lateral extension has an outer end portion provided with an integral projection disposed parallel to said parallel legs, said first extension together with said integral projection and a portion of said one of said parallel legs defining a wide base shallow channel which has an open end opening in a direction opposite from the direction of opening of said adjacent outwardly convex U-shaped portion and comprising said first connecting means, and a second lateral extension of rectangular cross-sectional configuration extending perpendicularly outwardly from the outer edge of one of said parallel legs of an adjacent U-shaped portion so that said U-shaped portions are disposed roughly in the central part of said strip, said second lateral extension being disposed and fixed within said channel and comprising said second connecting means, said lateral extensions being substantially of said uniform thickness and upon disposing said strip in said helical pattern said extensions cooperate to define said first and second connecting means having a radial thickness comprised of substantially twice said uniform thickness thereby assuring minimum material usage and thus minimum cost, some of said troughs being defined solely by said extensions.

8. In a convoluted hose construction comprising an elongated elastomeric strip having first and second connecting means defining opposite side edge portions thereof, said strip being helically wound with said first and second connecting means connected together to define said hose construction having alternating crests and troughs, said strip having a plurality of spaced apart free unobstructed outwardly convex U-shaped portions each being of a single uniform wall thickness continuously throughout which are the only parts of said strip defining said crests, each said outwardly convex U-shaped portion being defined by a bight and a pair of parallel legs extending from opposite ends of said bight, said hose construction being easily flexed from a rectilinear configuration upon applying a flexing force thereagainst due to said free U-shaped portions and uniform wall thickness, said strip comprising a first lateral extension extending perpendicularly outwardly from one of said parallel legs of an adjacent U-shaped portion and away from all of said legs, the improvement in which, said first lateral extension has an outer end portion provided with an integral projection disposed parallel to said parallel legs, said first extension together with said integral projection and a portion of said one of said parallel legs defining a wide base shallow channel which has an open end opening in a direction opposite from the direction of opening of said adjacent outwardly convex U-shaped portion and comprising said first connecting means, and a second lateral extension of rectangular cross-sectional configuration extending perpendicularly outwardly from the outer edge of one of said parallel legs of an adjacent U-shaped portion so that said U-shaped portions are disposed roughly in the central part of said strip, said second lateral extension being disposed and fixed within said channel and comprising said second connecting means, said lateral extensions being substantially of said uniform thickness and upon disposing said strip in said helical pattern said extensions cooperate to define said first and second connecting means having a radial thickness comprised of substantially twice said uniform thickness thereby assuring minimum material usage and thus minimum cost, the other leg of said U-shaped portion that is adjacent said second extension having a portion extending in a direction opposite from said first extension, said portion of said U-shaped portion that is adjacent said second extension cooperating with said first extension of an adjoining turn of the helically wound strip to define a substantially smooth inside surface for said hose construction.

9. A hose construction as set forth in claim 8 in which said one leg of said U-shaped portion that is adjacent said first extension has a shoulder at the base of said first extension which has a radial thickness of a dimension equal to said integral projection.

10. In a convoluted hose construction comprising an elongated elastomeric strip of a thermoplastic material having first and second connecting means defining opposite side edge portions thereof, said strip being helically wound with said first and second connecting means connected together to define said hose construction having alternating crests and troughs, said strip having a plurality of spaced apart free unobstructed outwardly convex U-shaped portions each being of a single uniform wall thickness continuously throughout which are the only parts of said strip defining said crests, each said outwardly convex U-shaped portion being defined by a bight and a pair of parallel legs extending from opposite ends of said bight, said hose construction being easily flexed from a rectilinear configuration upon applying a flexing force thereagainst due to said free U-shaped portions and uniform wall thickness, said strip comprising a first lateral extension extending perpendicularly outwardly from one of said parallel legs of an adjacent U-shaped portion and away from all of said legs, the improvement in which, said first lateral extension has an outer end portion provided with an integral projection disposed parallel to said parallel legs, said first extension together with said integral projection and a portion of said one of said parallel legs defining a wide base shallow channel which has an open end opening in a direction opposite from the direction of opening of said adjacent outwardly convex U-shaped portion and comprising said first connecting means, and a second lateral extension of rectangular cross-sectional configuration extending perpendicularly outwardly from the outer edge of one of said parallel legs of an adjacent U-shaped portion so that said U-shaped portions are disposed roughly in the central part of said strip, said second lateral extension being disposed and fixed within said channel and comprising said second connecting means, said lateral extensions being substantially of said uniform thickness and upon disposing said strip in said helical pattern said extensions cooperate to define said first and second connecting means having a radial thickness comprised of substantially twice said uniform thickness thereby assuring minimum material usage and thus minimum cost, said second lateral extension having a dimension perpendicular to its leg which is greater than said uniform thickness and said wide base of said channel being at least twice said uniform thickness to thereby define a maximum interface between said lateral extensions and thus a maximum area of connection between said connecting means.

11. A hose construction as set forth in claim 10 and further comprising means bonding said extensions together at said interface.

12. A hose construction as set forth in claim 11 in which said elongated elastomeric strip is a strip of thermoplastic material.

13. A hose construction as set forth in claim 12 in which said adhesive means comprises an initially molten thermoplastic material.

14. A hose construction as set forth in claim 11 in which said strip has the same exact uniform wall thickness throughout its U-shaped portions, second extension, and first extension plus its projection.

15. A hose construction as set forth in claim 14 in which said extensions are heat fused at said interface and define said bonding means.

16. A hose construction as set forth in claim 14 in which said extensions are solvent fused at said interface and define said bonding means.

17. A hose construction as set forth in claim 14 in which said elastomeric strip is an extruded strip.

18. A hose construction as set forth in claim 11 in which each of said bight of said strip is a semicylindrical bight.

19. A hose construction as set forth in claim 18 in which said first lateral extension is a rectilinear extension having a planar surface defining the bottom of said wide base shallow channel.

* * * * *